United States Patent [19]

Ziph-Schatzberg et al.

[11] Patent Number: 5,283,695
[45] Date of Patent: Feb. 1, 1994

[54] ATHERMALIZED OPTICAL SYSTEM AND METHOD

[75] Inventors: Leah Ziph-Schatzberg, North Andover; Joseph A. Wheeler, Gloucester; Philip A. Rombult, Bradford, all of Mass.

[73] Assignee: Miles, Inc., Wilmington, Mass.

[21] Appl. No.: 927,607

[22] Filed: Aug. 10, 1992

[51] Int. Cl.⁵ .............................................. G02B 7/02
[52] U.S. Cl. ................................... 359/820; 359/220; 369/112
[58] Field of Search ............... 359/819, 820, 217, 218, 359/220, 216; 369/112, 44.24, 44.32

[56] References Cited

U.S. PATENT DOCUMENTS

| | | |
|---|---|---|
| 4,236,790 | 12/1980 | Smith . |
| 4,720,168 | 1/1988 | Kaneko . |
| 4,815,059 | 3/1989 | Nakayama et al. . |
| 4,855,987 | 8/1989 | Versluis ........................... 369/112 |
| 5,155,616 | 10/1992 | Yamaguchi et al. ............. 359/216 |

FOREIGN PATENT DOCUMENTS

| | | | |
|---|---|---|---|
| 59-15204 | 1/1984 | Japan ................................. 359/820 |
| 59-15205 | 1/1984 | Japan ................................. 359/820 |

*Primary Examiner*—Loha Ben
*Attorney, Agent, or Firm*—Richard J. Birch

[57] ABSTRACT

An athermalized optical system and method are disclosed. A thermally compensating portion of the optical system is employed to compensate for mechanical and optical thermal effects in the entire optical system. In the preferred embodiment, the optical system comprises an imaging system having a laser diode light source, a collimating lens, a rotating mirror, a scan lens and a media transport. Temperature compensation of the imaging system is obtained by varying the spacing between the laser diode and the collimating lens to decollimate the laser light beam as a function of the system wide temperature effects.

11 Claims, 4 Drawing Sheets

ND METHOD

ATHERMALIZED OPTICAL SYSTEM AND METHOD

CROSS-REFERENCE TO RELATED APPLICATION

The present application is related to the application of Philip A. Rombult for Conical Lens Mount For Athermalized Optical System filed Aug. 12, 1992 as Ser. No. 07/929,760.

BACKGROUND OF THE INVENTION

The present invention relates to temperature compensation of optical systems and, more particularly, to the use of the thermal characteristics of a laser beam source module to compensate for temperature effects on the entire optical system in which it is used. The laser beam source module comprises a semiconductor laser diode, a collimating lens and the mechanical structure to provide proper spacing and support of the components.

It is well known that the imaging performance of an optical system is dependent on temperature. Increases and decreases in ambient temperature changes the physical dimensions of both the lens elements as well as the mechanical components of the optical system. Also, the refractive properties of the lens elements change with changes in ambient temperature. For systems using semiconductor laser diodes, there is an additional temperature dependency, namely, that the emitted wavelength is a function of the ambient temperature. These wavelength variations affect the imaging performance of systems that depend on the relationship of refractive index to wavelength.

Many prior art techniques have successfully compensated for some or all of the above temperature dependent factors in an optical device to maintain its original imaging performance. Most of these techniques are expensive and incorporate complicated linkages or use of fluids. Representative examples of systems that maintain beam collimation are shown in U.S. Pat. Nos. 4,720,168, 4,855,987 and 4,815,059. U.S. Pat. No. 4,236,790 illustrates an optical apparatus that maintains a fixed mechanical distance between two surfaces such as, a lens and an image plane, so that the distance between them is independent of ambient temperature. The predetermined distance is maintained between the two surfaces by actively heating or cooling the apparatus. The temperature compensation technique of the '790 patent is similar to those described in the '168, '987 and '059 patents only it is reversed in the sense of maintaining a fixed focus and not necessarily collimation.

Temperature compensated devices often are incorporated in larger and more complicated systems. In such systems, the temperature compensated device compensates for itself while the rest of the optical system suffers from all of the temperature dependent factors mentioned above.

It is, accordingly, a general object of the invention to provide an athermalized optical system.

It is another object of the invention to provide an athermalized optical system in which a thermally compensated system component compensates for mechanical and optical thermal effects of the entire optical system.

It is still another object of the invention to provide an athermalized optical system that maintains focus on the last surface of the system taking into account all of the effects of temperature in the system.

It is a further object of the invention to provide an athermalized imaging system having a laser beam generating module, a collimator, a rotating mirror, scan lens and media transport.

It is a feature of the invention that the athermalization of the optical system can be accomplished in an inexpensive manner using a minimum of standard structural materials.

It is another feature of the invention that the athermalization is achieved without "actively" moving or sliding parts, without expensive linkages and without heating or cooling components of the optical system.

SUMMARY OF THE INVENTION

The present invention provides an athermalized optical system having a thermally compensating portion that compensates for mechanical and optical thermal effects in the entire optical system. The thermally compensating portion of the optical system maintains focus on the last surface of the system by taking into account all of the effects of temperature in the system and then cancelling out those effects. In the preferred embodiment, the imaging system has a laser diode, a collimating lens, a rotating mirror, a scan lens and a media transport. Temperature compensation of the imaging system is achieved by varying the spacing between the laser diode and the collimating lens to decollimate the laser light beam as a function of the system wide temperature effects.

BRIEF DESCRIPTION OF THE DRAWINGS

The objects and features of the invention will best be understood from a detailed description of a preferred embodiment thereof, selected for purposes of illustration and shown in the accompanying drawings, in which.

DETAILED DESCRIPTION OF A PREFERRED EMBODIMENT

Figure 1:
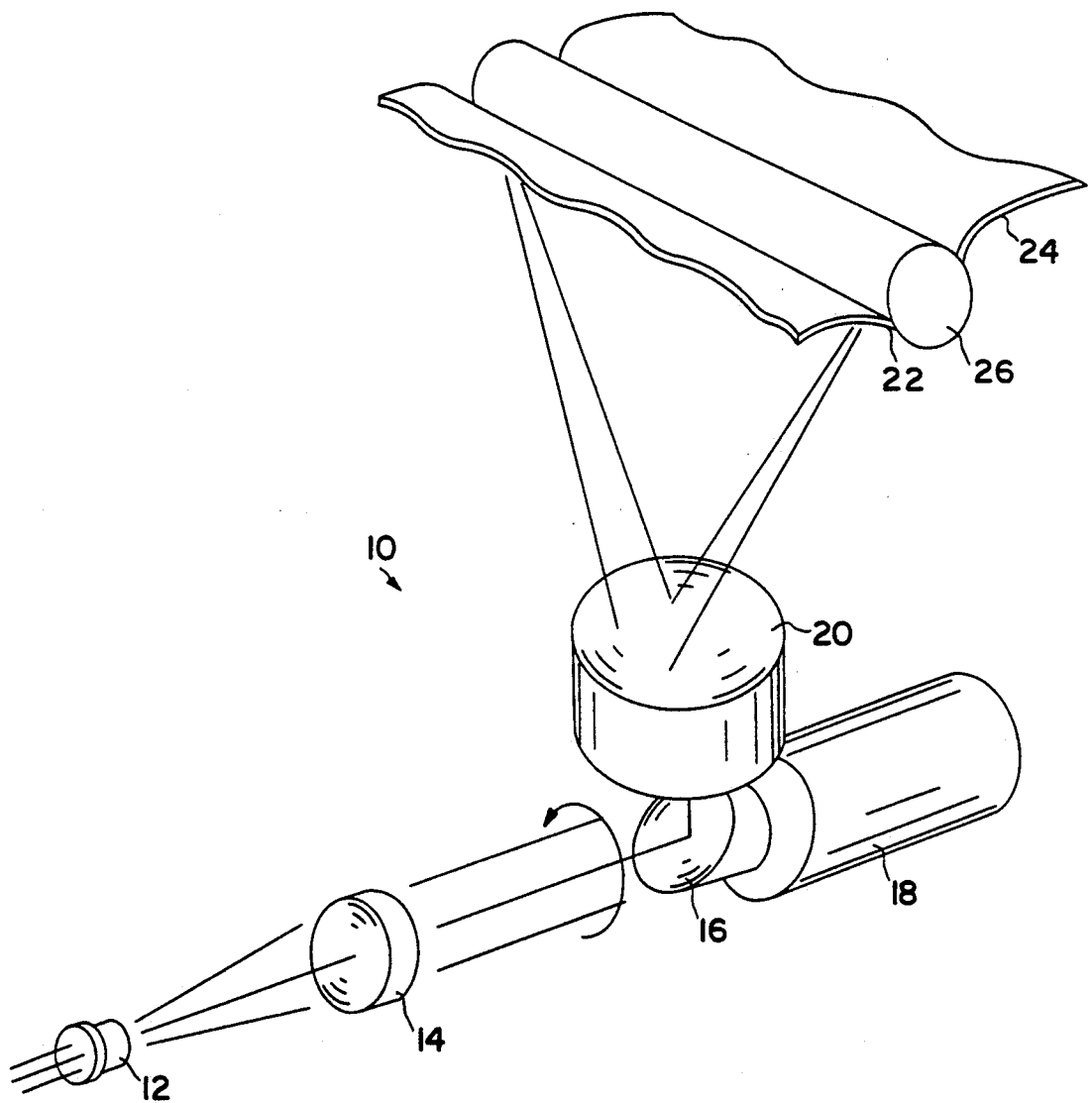
FIG. 1 is a schematic view in perspective of the optical system of an imaging apparatus.

Turning now to the drawings, and particularly to FIG. 1 thereof, there is shown in perspective and schematic form the optical system of an imaging apparatus indicated generally by the reference numeral 10. The imaging apparatus 10 comprises a light source such as, a semiconductor laser diode 12, a collimating lens 14, a rotating mirror 16 that is rotated by motor 18, a scan lens such as, an F-THETA scan lens 20, which images the beam from laser diode 12 onto an image plane locator 22 at which is positioned a photosensitive media 24 that is moved through the image or film plane 22 by a media transport 26. The collimating lens 14 produces a nominally collimated beam of light from the laser diode 12. The beam is scanned by the rotating mirror 16 and focused by scan lens 20 onto the image plane 22. The present invention provides for the spacing between light source 12 and collimating lens 14 to be thermally adjusted in a manner such that the final image of the scan lens 20 remains on media 24 at the image plane 22.

Figure 2:
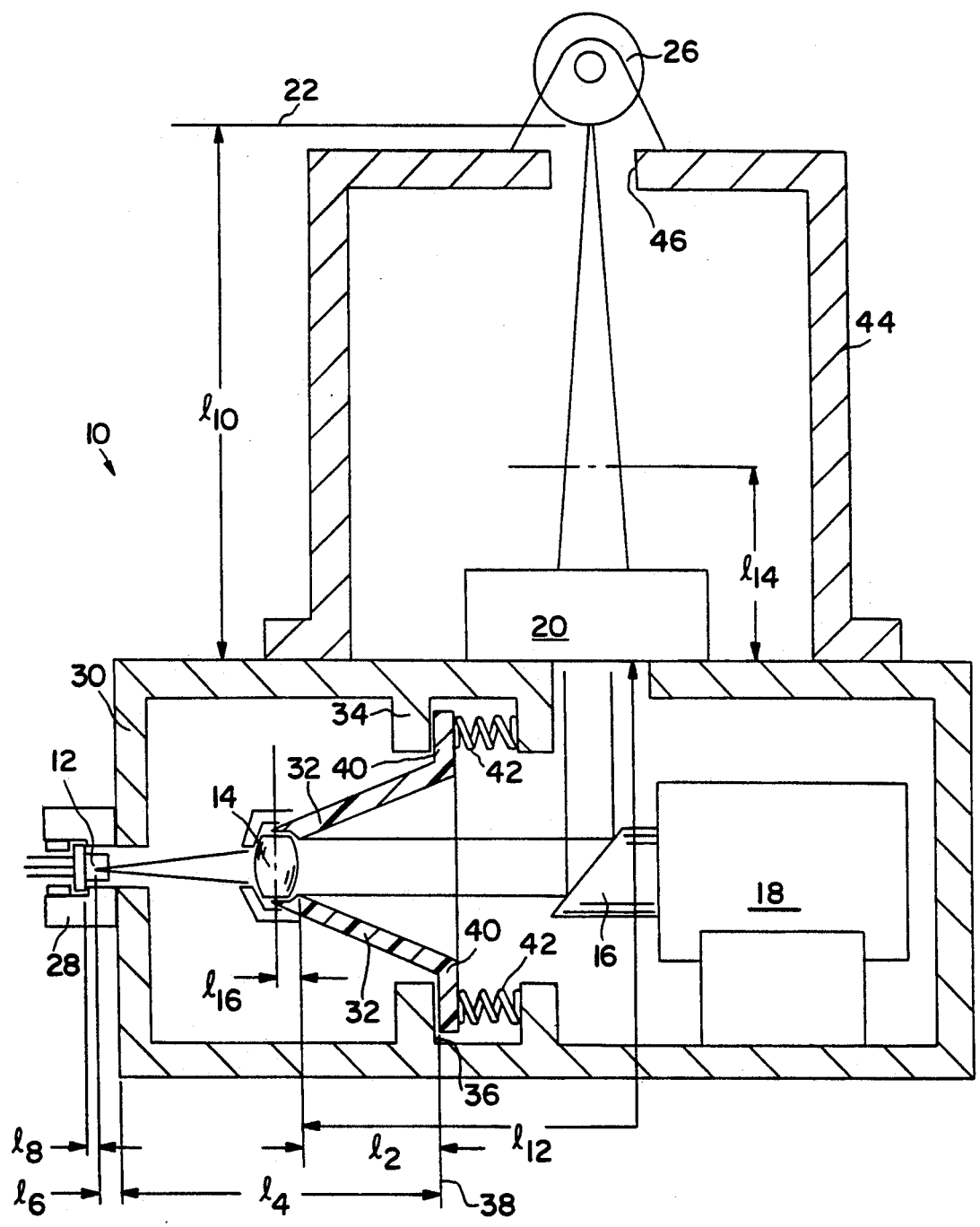
FIG. 2 is a simplified view in partial section of an athermalized imaging system.

The structural elements of the imaging apparatus 10 are shown in greater detail in the partial sectional view of FIG. 2. Starting with the light source laser diode 12, the laser diode is mounted in a mount 28 that is fixed with respect to an imager frame 30. The collimating lens 14 is positioned within the imager frame by means of a conically shaped collimator housing 32. The imager frame 30 has an inwardly extending annular portion 34 having a surface 36 that defines a fixed reference plane 38. The conically shaped collimator housing 32 has an annular base 40 that is held against the reference plane 38 defined by surface 36 by spring loading provided by springs 42. The scan lens 20 is mounted at one end of an engine frame 44 having an aperture 46 through which the output beam from scan lens 20 is focused at image plane locator 22 that is mounted at the opposite end of the engine frame.

The distances between $l_2$ through $l_{16}$ shown in FIG. 2 indicate optical and mechanical distances that are defined in FIG. 4 of the drawings and will be discussed below. The same distances are employed in FIG. 3 which shows a variation of the optical system that does not utilize the beam folding and scanning of mirror 16.

Figure 3:
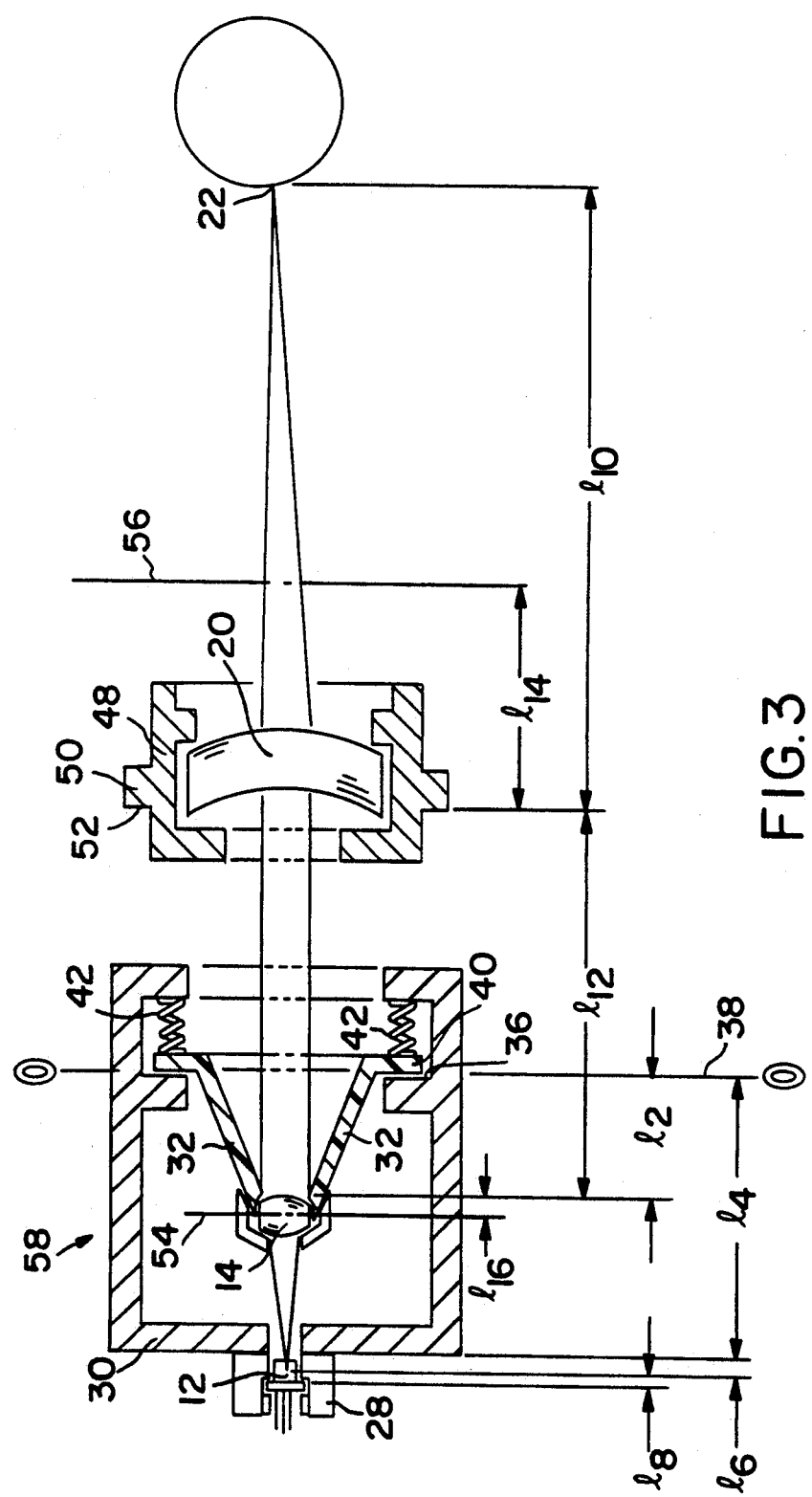
FIG. 3 is a simplified view in partial section of an athermalized imaging system depicting the geometric relationship of the system components; and, FIG. 4 is a diagram illustrating the optical and mechanical relationship of the athermalized imaging system.

Referring to FIG. 3, the same reference numerals have been used as those shown in FIG. 2 to identify the same components. The scan lens 20 is mounted within a lens housing 48 having a lens flange 50, the surface 52 of which defines one end of distance $l_{12}$ (See FIGS. 2 and 4). The principal planes of the collimating and scan lenses 14 and 20, respectively, are indicated by reference numerals 54 and 56, respectively.

It will be appreciated from the preceding discussion that the spacing between the laser diode 12 and the collimating lens 14 is thermally adjusted to maintain focus on the last system surface i.e., image plane of locator 22 at the photosensitive media 24. The proper linear thermal expansions of the imager frame 30 and the collimating lens housing 32 are determined to achieve the correct spacing. The spacing requirement takes into account the thermal expansion of the glass(es) employed in the collimating lens 14, the changes in refractive index of the individual glass type(s) and the effect on their optical performance due to the change in wavelength of the laser diode 12 as a function of temperature. The required spacing is that which will shift the focus of the nominally collimated laser beam by a precise amount. The precise amount is predicated on the changes in the rest of the optical system due to the same temperature dependent factors mentioned above.

The focusing power of the scan lens 20 is affected by the thermal expansions of its elements and their change in index of refraction with temperature and the change of wavelength. In addition, the engine frame 44 separating the scan lens 20 from the photosensitive media 24 increases or decreases in length with temperature based on its coefficient of thermal expansion. Due to the system level temperature dependencies, if the laser beam source module (the laser diode, collimating lens and the mechanical structure holding and separating these components) were thermally compensated to maintain a collimated beam then the final image of scan lens 20 would not remain on the photosensitive media 24.

What is desired is a controlled decollimation of the beam to compensate for thermal effects in the entire optical system. This is achieved through the differential growth of the collimator housing 32 and imager frame 30 with respect to the nonvarying reference plane 38. The critical lengths are measured from this plane to the collimating lens 14 and laser diode 12.

Figure 4:
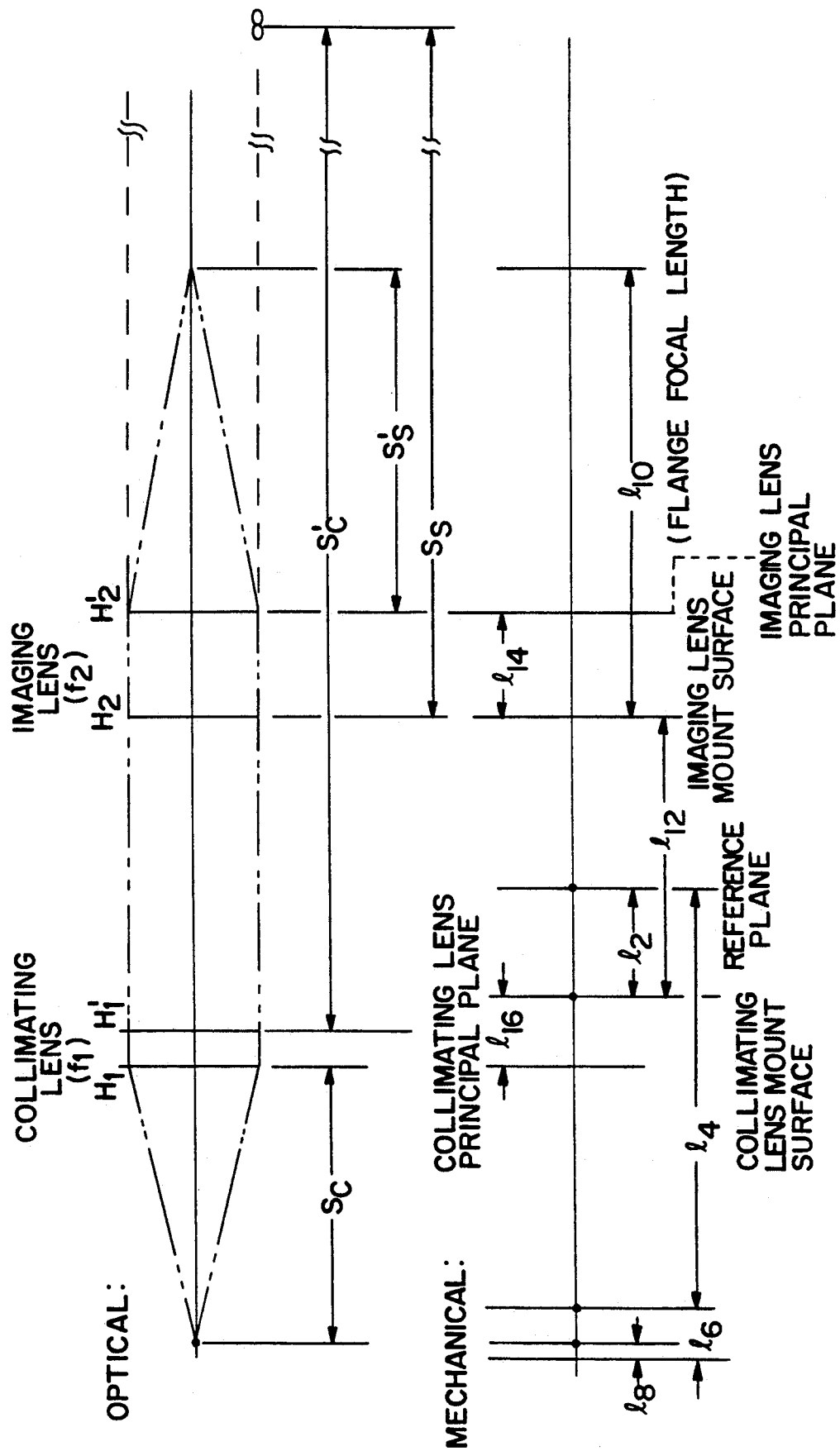

The following analysis of the optical and mechanical distances should be read in conjunction with FIGS. 2, 3, and 4. The Lens Makers Equation with slight notational changes will be used.

$$\frac{1}{S'} = \frac{1}{f} + \frac{1}{S} \qquad (1)$$

Where $-S$ is the distance from the object to the first principal plane of a lens, $S'$ is the distance from the second principal plane of the lens to its image of the object (for perfect collimation $S' = \infty$), and $f$ is the effective focal length (EFL) of the lens. For this case the laser diode 12 is initially located at the front focal plane of the collimating lens 14. Therefore, from Equation 1, $S'_{co}$ is equal to infinity (perfectly collimated). The image distance for the collimating lens ($S'_{co}$) minus the spacing between the collimating lens 14 and the scan lens 20, $l_{12}$, results in the object distance ($S_{so}$) for the scan lens. Initially, $S_{so}$ is equal to negative infinity (the sign change is to maintain sign convention for Eq. 1) with the result that $S'_{so}$ equals to EFL of the scan lens. This location establishes the initial location of the image plane 22 for the photosensitive media 24, which is structurally positioned by the engine frame 44. In order to ensure that at any expected temperature the final image of the laser diode 12 is located on the photosensitive media 24, thermal compensation is designed into the laser beam source module 58 (the laser diode, collimating lens and the mechanical structure holding and separating these elements).

The effects of temperature on the complete optomechanical system are numerous. The mechanical components establishing the separation of the laser diode 12 and collimating lens 14 ($S_{co}$) are all affected differently based on their individual coefficients of thermal expansion. Also affected in a similar manner is the engine frame 44 separating the scan lens 20 from the media plane 22 ($S'_{so}$). Another consideration is the temperature effects on the lenses themselves. The parameters of the lenses; EFL, principal plane locations and front and back focal length, are all affected by temperature. These effects are driven by dimensional changes due to coefficients of thermal expansion of the glass elements as well as the metal spacers (if applicable). Additionally, changes to the indices of refraction of the elements due to temperature and in this case due to changes in the wavelength of light emitted by the laser diode 12 as a function of temperature also must be considered.

Based on the above discussions, the design is approached by starting with the need to maintain the final image of the scan lens 20 on the photosensitive media 24 at some $\Delta T$, relative to the initial temperature. At this $\Delta T$ the value of $S'_s$ is determined based on the expansion of the engine frame 44, which establishes the distance between the scan lens 20 and the media 24 at image plane 22.

$$S'_s = l_{10} + (\alpha_{10} * \Delta T * l_{10}) = l_{14} \qquad (2)$$

Next the new EFL of the scan lens must be determined at $\Delta T$. This is done by modifying the values of each parameter of the prescription as described above. The new EFL, principal plane locations and front and back focal lengths can then be determined by using methods described in References 1 and 2 or by using any number of commercially available lens design computer programs (such as OSLO series II, CODE V, etc.). Once this is done the desired value of $S_s$ can be solved for by reorganizing Eq. given the desired value of $S'_s$ and the modified EFL of the scan lens 20.

$$S_s = \frac{S'_s * f_2}{f_2 - S'_s} \quad (3)$$

This value of $S_s$ will be slightly different than the initial value of negative infinity since $S'_s$ and the new EFL of the scan lens are no longer equal. This value of $S_s$ minus the distance separating the two lenses, $l_{12}$, becomes the newly desired $S'_c$ $$S'_s = -[S_s - [l_{12} + (\alpha_{12} * \Delta T * l_{12})]] \quad (4)$$

(sign change is to maintain sign convention). This value, $S'_c$, represents the required imaging performance of the laser beam source module at $\Delta T$.

The present invention provides the required imaging performance using the thermal dependencies of the optics and mechanics within the laser beam source module given the same $\Delta T$. First, the collimating lens prescription is modified using the same method as was used for the scan lens. Then with the desired $S'_c$ at $\Delta T$ and the new EFL for the collimating lens 14 at $\Delta T$ the desired distance between the laser diode 12 and the collimating lens 14 ($S_c$) can be solved for using Equation 5.

$$S_c = \frac{S'_c * f_1}{f_1 - S'_c} \quad (5)$$

In order to satisfy system athermalization, the value of $S_c$ must thermally adjust to always equal the desired value of $S_c$ at $\Delta T$. The initial value of $S_{co}$ establishes the combined sum length of the structural components of the source module at the original temperature, $$S_{co} = l_4 + l_6 + l_8 - l_2 - l_{16} \quad (6)$$

At $\Delta T$ this length becomes, $$S_c = [(l_4 + (\alpha_4 * \Delta T * l_4)) + (l_6 + (\alpha_6 * \Delta T * l_6)) + (l_8 + (\alpha_8 * \Delta T * l_8)) - (l_2 + (\alpha_2 * \Delta T * l_2)) - l_{16} \quad (7)$$

Knowing the required value of $S'_c$ at $\Delta T$ from Equation 5, Equations 6 and 7 can be used to determine the final design parameters. First, assign values to all but two of the variables, lengths $l_i$ and coefficients of thermal expansion $\alpha_i$ (two equations and two unknowns). By tailoring the choices to the asigning of the lengths and materials to the all but two values, the final solution can be made more practical. It should be noted that this should be the case if the two longest components ($l_2$ and $l_4$ for example) have different coefficients of thermal expansion. Other than that, the material can be selected based on cost, structural parameters etc.

The result is a complete optical system thermally compensated by a device which is a component of the system. The device accomplishing all of the thermal compensation is the laser beam source module 58. Thus, there are no "actively" moving or sliding parts to wear or bind; there are no expensive linkages or fluid chambers; and, furthermore, the chosen materials can be inexpensive castable metals or moldable plastics with a sufficiently stable geometry.

It will be appreciated from the above analysis of the optical and mechanical requirements that various materials can be utilized to achieve the desired system wide athermalization through temperature compensation of a system component e.g., the laser beam module 58. Aluminum is an optimal choice of material for the imager frame 30 because the density and modulus of aluminum match the structural and weight requirements of the part. The collimator housing 32 in the configuration shown has a higher thermal expansion coefficient than the imager frame 30. LEXAN 141 (Trademark of General Electric) is used because of its material properties, ease of fabrication and relative low cost. The conical shape of the collimator housing 32 provides both structural rigidity and resistance to creep deformation. For both the imager frame 30 and the collimator housing 32, wall thicknesses are kept uniform so that changes in temperature produced controlled linear growth of the parts. Although aluminum and the polycarbonate LEXAN are described, it should be understood that the invention is not limited to these two materials. Any two materials with different coefficients of thermal expansion can be employed. The thermal expansions of the two materials are used to determine the individual lengths required to provide the required spacing change, with respect to temperature, between the laser diode 12 and the collimating lens 14, thereby providing the precise amount of thermal compensation for the entire system.

Having described in detail a preferred embodiment of our invention, it will now be apparent to those skilled in the art that numerous modifications can be made without departing from the scope of the invention as defined in the following claims:

What we claim is:

1. An athermalized imaging apparatus comprising:
   (a) a light source means for emitting a light beam;
   b) a collimating lens means for collimating the light beam from said light source means to produce a collimated light beam;
   (c) a focusing lens means for focusing the collimated light beam from said collimating lens means; and,
   (d) means responsive to temperature effects on said light source means, said collimating lens means and said focusing lens means for decollimating said collimated light beam as a function of the combined temperature effects on said light source means, said collimating lens means and said focusing lens means.

2. The athermalized imaging apparatus of claim 1 wherein said means responsive to temperature effects comprises means for varying the spacing between said light source means and said collimating lens means.

3. The athermalized imaging apparatus of claim 2 wherein said means for varying the spacing between said light source means and said collimating lens means includes means for mounting said light source means and means for mounting said collimating lens means, said light source and collimating lens mounting means having different coefficients of thermal expansion.

4. The apparatus of claim 3 wherein said light source mounting means is formed of aluminum and said collimating lens mounting means is formed of a polycarbonate.

5. The apparatus of claim 3 wherein said collimating lens mounting means has a generally truncated conical configuration.

6. The apparatus of claim 5 wherein said collimating lens means is mounted, at the apex of said generally truncated conical configured collimating lens mounting means.

7. The apparatus of claim 6 wherein said means for varying the spacing between said light source means and said collimating means includes means defining a reference surface and wherein said generally truncated conical configured collimating lens mounting means includes an annular base portion and, further comprising means for urging said annular base portion into contact with said reference surface.

8. An athermalized imaging apparatus comprising:
 (a) a light source means for emitting a light beam;
 (b) means for mounting said light source means;
 (c) a collimating lens means for collimating the light beam from said light source means to produce a collimated light beam;
 (d) means for mounting said collimating lens means;
 (e) a focusing lens means for focusing the collimated light beam from said collimating lens means;
 (f) means for mounting said focusing lens means;
 (g) an image plane locator means;
 (h) means for mounting said image plane locator means; and,
 (i) means responsive to temperature effects on said light source means and its mounting means, said collimating lens means and its mounting means, said focusing lens means and its mounting means and said image plane locator means and its mounting means for decollimating said collimated light beam as a function of the combined temperature effects on all of said means.

9. A method for thermally compensating an imaging apparatus having a light source, a collimating lens, and a focusing lens, said method comprising the steps of:
 (1) determining the effects of temperature on the light source, the collimating lens and the focusing lens; and,
 (2) varying the spacing between the light source and the collimating lens as a function of the combined temperature effects on said light source, said collimating lens and said focusing lens to decollimate a collimated light beam produced by said light source and said collimating lens.

10. A method for thermally compensating an imaging apparatus having a light source, a light source mount, a collimating lens, a collimating lens mount, a focusing lens, a focusing lens mount, an image plane locator and an image plane locator mount, said method comprising the steps of:
 (1) determining the effects of temperature on the light source, the collimating lens, the focusing lens, image plane locator and the mounts therefor; and,
 (2) varying the spacing between the light source and the collimating lens as a function of the combined temperature effects on said light source, said collimating lens, said focusing lens, said image plane locator and the mounts therefor.

11. The method of claim 10 wherein said light source mount and said collimating lens mount have preselected different thermal coefficients of expansion and wherein the spacing is varied by the differential growth of said light source mount and said collimating lens mount.

* * * * *